M. & M. G. COOK.
Bobbin-Winders for Sewing-Machines.

No. 148,110  Patented March 3, 1874.

WITNESSES:
Chas. Nida
Sedgwick

INVENTOR:
M. Cook
M. G. Cook
BY
ATTORNEYS.

AM. PHOTO-LITHOGRAPHIC Co. N.Y. (OSBORNE'S PROCESS.)

UNITED STATES PATENT OFFICE.

MOSES COOK AND MOSES G. COOK, OF ASHFIELD, MASSACHUSETTS.

IMPROVEMENT IN BOBBIN-WINDERS FOR SEWING-MACHINES.

Specification forming part of Letters Patent No. 148,110, dated March 3, 1874; application filed January 5, 1874.

*To all whom it may concern:*

Be it known that we, MOSES COOK and MOSES G. COOK, of Ashfield, in the county of Franklin and State of Massachusetts, have invented a new and Improved Bobbin-Winder, of which the following is a specification:

Our invention consists of a traverse mechanism for a bobbin-winder for sewing-machine, in which a drum with a reversing cam-groove for working the traversing-guide forward and back along the spool has the necessary slow motion for moving the guide imparted to it by a pawl and a friction griping-strap, the pawl being worked by a crank, tappet, cam, or eccentric on the bobbin-turning shaft, which receives motion from the sewing-machine wheel by a friction-wheel, said pawl having an adjusting-screw to regulate the extent of its movements so as to turn the drum fast or slow, according to the size of the threads, and the drum having a friction strap and spring for holding it when released by the griping-spring. The bobbin has a spring on its spindle for fastening the thread to it at the beginning. The spool holder has a tension-spring to regulate the unwinding of the thread from it.

Figure 1:
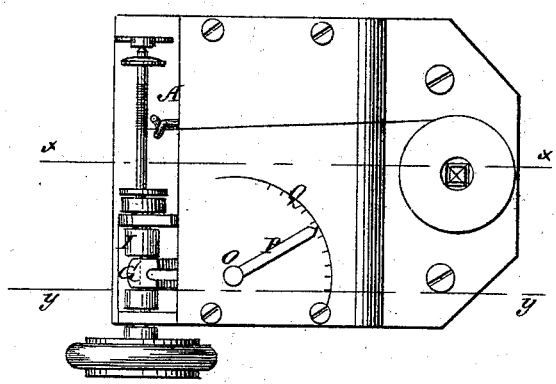
Figure 2:
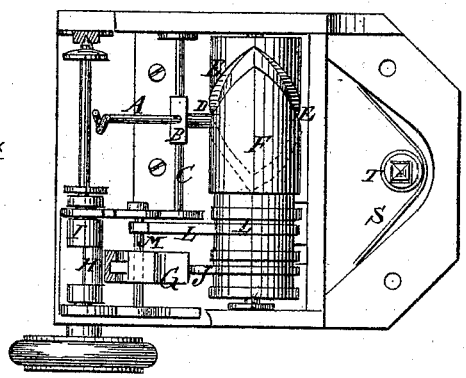
Figure 3:
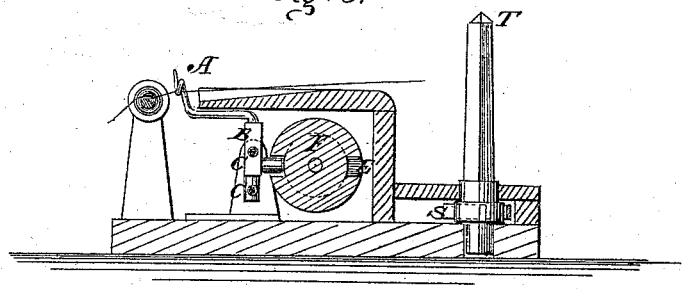
Figure 4:
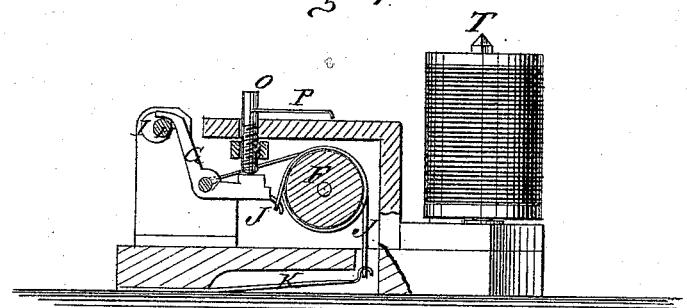
Figure 5:
Figure 6:

Figure 1 is a plan view of our improved winder. Fig. 2 is a plan with the top of the case removed and the frame shown partly in section. Fig. 3 is a transverse section on the line *x x* of Fig. 1. Fig. 4 is a section on the line *y y* of Fig. 1. Figs. 5 and 6 are side elevations of the bobbin, showing the spring for fastening on the end of the thread.

A is the traverse-guide, which is mounted on the block B, fitted to slide forward and backward on the rods C, being provided for that purpose with a stud-pin, D, projecting into the cam-groove E of the drum F. The drum is revolved by the pawl G, tappet or eccentric part H of the bobbin-shaft I, and the metallic friction-band J, the latter going once or twice around the drum, and being attached at one end to said pawl and at the other to the spring K. L is a metallic band similar to J, attached at one end to any permanent device, say the rod M, and going around the drum, and attached at the other end to another spring (not shown) similar to K, to serve as a brake to prevent the drum from turning either forward or backward when the griping-strap J lets go to take a new hold. The grip of the strap J on the drum, when the pawl is thrown by the eccentric, is to be a little greater than that of the brake-strap, so that the drum will be turned forward; but when the pawl goes back the pawl-strap unwinds from the drum, so that its spring draws it back with less friction on the drum than the brake-strap has. Thus the drum has very slow intermittent motion, obtained directly from the quick-moving bobbin-shaft I, with very simple and inexpensive mechanism; and said mechanism allows of varying the motion for moving the traverse-guide slow or fast for threads of different sizes, by simply changing the throw of the pawl by a set-screw, O. This screw will be provided with a pointer, P, and a scale, Q, by which to aid the operator in setting it for the motions wanted for threads of different sizes. R represents the catch-spring on the bobbin-spindle, for fastening the end of the thread at the beginning of the winding. S is the tension-spring of the spool-holding spindle T, and U is the friction-wheel on the bobbin-shaft forgetting the motion from the sewing-machine wheel.

Having thus described our invention, we claim as new and desire to secure by Letters Patent—

The combination of the pawl G, griping-band J, and a brake with eccentric or cranked bobbin-shaft, the grooved drum and the traversing-guide of a bobbin-winder, substantially as specified.

MOSES COOK.
MOSES G. COOK.

Witnesses:
HENRY S. RANNEY,
MINERVA H. COOK.